United States Patent
Turner et al.

(10) Patent No.: US 6,546,094 B1
(45) Date of Patent: Apr. 8, 2003

(54) PROVISIONING OF CABLE TELEPHONE SERVICE

(75) Inventors: James Lee Turner, Lemont, IL (US); Frank Ven Wilson, Jr., Bolingbrook, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/557,585

(22) Filed: Apr. 22, 2000

(51) Int. Cl.[7] .................. H04M 3/42; H04M 11/00; H04N 7/173
(52) U.S. Cl. .................. 379/201.12; 348/14.01; 348/552; 379/90.01; 379/201.05; 725/106; 725/110
(58) Field of Search ................ 348/14.01, 14.04, 348/552; 379/90.01, 201.01, 201.05, 201.12; 725/106, 109, 110, 111, 131

(56) References Cited

U.S. PATENT DOCUMENTS

| | | | |
|---|---|---|---|
| 5,640,196 A | * 6/1997 | Behrens et al. | 348/14.02 |
| 5,774,527 A | * 6/1998 | Handelman et al. | 725/106 |
| 5,999,612 A | * 12/1999 | Dunn et al. | 348/552 |
| 6,396,531 B1 | * 5/2002 | Gerszberg et al. | 348/14.01 |

* cited by examiner

Primary Examiner—Harry S. Hong
(74) Attorney, Agent, or Firm—Walter W. Duft (57) ABSTRACT

A system and method for provisioning cable telephone service in a cable communication system that is at least partially integrated with a telephone network. The cable communication system includes a head end Remote Digital Terminal (RDT) respectively communicating with a broadband network, a telephone switch and a customer premises Integrated Service Unit (ISU), and also includes an Order Management Center (OMC) associated with the RDT, the switch, or both. To implement telephone service to customer premises equipment adapted for communication with the ISU, the RDT is notified of a new service request by way of a service request message sent from the ISU to the RDT, and the switch is notified of the new service request by way of provisioning information sent from the OMC to the switch via an Element Management System (EMS) associated with the switch. Advantageously, the RDT and the switch are adapted exchange information needed to coordinate the provisioning of telephone service to the customer premises equipment. In a first embodiment, which is useful when the OMC and the switch are not owned by the same service provider, the service option information sent to the switch is initially provided to the OMC via an in-service telephone. In a second embodiment, which is useful when the OMC and the switch are co-owned, the service option information is initially provided to the OMC via a temporary telephone connection established between the customer premises equipment and the OMC.

27 Claims, 7 Drawing Sheets

PROVISIONING OF CABLE TELEPHONE SERVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to cable telephone service. More particularly, the invention concerns the provisioning of cable telephone service to new telephone service subscribers.

2. Description of the Prior Art

Coaxial cable communication systems have historically been implemented separately from telephone networks. Cable subscribers desiring telephone service thus had to obtain such service from a telephone service provider. The provisioning and installation of each type of service has been completely independent of the other and, like the physical networks themselves, there has been no common point where this activity has come together.

More recently, cable service providers have begun offering telephone service delivered via the subscriber premises cable drop, i.e., the cable communication system and the telephone network have become partially integrated. When telephone service is provided in this way, a number of manual steps must be taken to provision a subscriber for service. These steps typically include the subscriber making separate telephone calls to telephone and cable service providers to request service, a possible cable service provider truck roll to the subscriber premises to install the customer premises telephone equipment, a possible cable service provider truck roll to a cable head end location to provision the head end, and a series of coordinating communications between an Order Management Center (OMC) owned by the cable service provider and an OMC owned by the telephone service provider.

In the fierce competition between providers of high-speed multimedia services offering both voice and data communication support, those that can offer quality service with a high degree of convenience will have a decided advantage. With their ubiquitous high-speed coaxial cable networks, cable companies seem well positioned to meet this challenge. However, wide spread acceptance of multimedia cable services will require the ability to offer low cost telephone service without complicated or lengthy service setup procedures. What is required is an improved cable telephone service provisioning system and method wherein functions previously performed by cable network and telephone network service personnel are automated, and cable telephone service provisioning is rapid and easy to implement from the customer perspective.

SUMMARY OF THE INVENTION

The foregoing problems are solved and an advance in the art is obtained by a novel system and method for provisioning cable telephone service in a cable communication system that integrates at least partially with a telephone network. The cable communication system includes a head end Remote Digital Terminal (RDT) respectively communicating with a broadband network, a telephone switch and a customer premises Integrated Service Unit (ISU). The cable communication system also includes an OMC associated with the RDT, the switch, or both. To implement telephone service to customer premises equipment adapted for communication with the ISU, the RDT is notified of a new service request by way of a service request message sent from the ISU to the RDT. The switch is notified of the new service request by way of information sent from the OMC to the switch via an Element Management System (EMS) associated with the switch. Advantageously, the RDT and the switch are adapted to exchange information needed to coordinate the provisioning of telephone service on behalf to the customer premises equipment without manual provisioning steps having to be performed. In a first embodiment, which is useful when the OMC and the switch are not owned by the same service provider, the service option information sent to the switch is initially provided to the OMC via an in-service telephone. In a second embodiment, which is useful when the OMC and the switch are co-owned, the service option information is initially provided to the OMC via a temporary telephone connection established between the customer premises equipment and the OMC.

In the first preferred embodiment of the invention, a request for telephone service to the customer premises equipment is received at the OMC. The telephone service request includes service option information and an Electronic Serial Number (ESN) associated with the customer premises equipment. The service option information and the ESN are sent from the OMC to an EMS associated with the switch. The EMS sends the service option information, the ESN and a Directory Number (DN) to the switch, which stores this information in a switch database. The switch also determines a Call Reference Value (CRV) and associates it with the service option information, the ESN and the DN in the switch database. A request is then sent from the switch to the RDT to create an Analog Line Termination (ALT) object in an RDT database. The ESN is also sent from the switch to the RDT for storage in the RDT database in association with the ALT.

At the RDT, a New Request for Service (NRS) message is received from the ISU via a Network Interface Unit (NIU) located at the customer premises. The NRS contains the subscriber premises equipment ESN. A comparison is then made at the RDT between ESN received in the NRS message with the ESN stored in the RDT database. If the ESN's match, the RDT sends a Change-In-Status (CIS) message to the switch requesting that the CRV be set to In-Service (IS) status.

In the second preferred embodiment of the invention, the RDT receives an NRS message sent from the ISU via the NIU located at the customer premises. The NRS contains the customer premises equipment ESN. The ESN is associated with a CRV at the RDT. The RDT then sends a message to the switch advising of the ESN and the CRV. The switch assigns restricted telephone service to the CRV using a selected Line Class Code (LCC) with connectivity to the OMC. A message is also sent from the switch to the RDT requesting the RDT to create an ALT object for the CRV in an RDT database.

In response to the subscriber premises equipment going off hook, a connection is set up from the customer premises equipment to the OMC. Through this connection, the OMC receives service option information relative to the customer premises equipment and requests an EMS associated with the switch (and the OMC) to setup service for the customer premises equipment. The EMS determines a DN to assign to the customer premises equipment and forwards the service option information and the DN to the switch. The service option information and the DN are store in a switch database. The CRV is then activated to full In-Service (IS) status.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
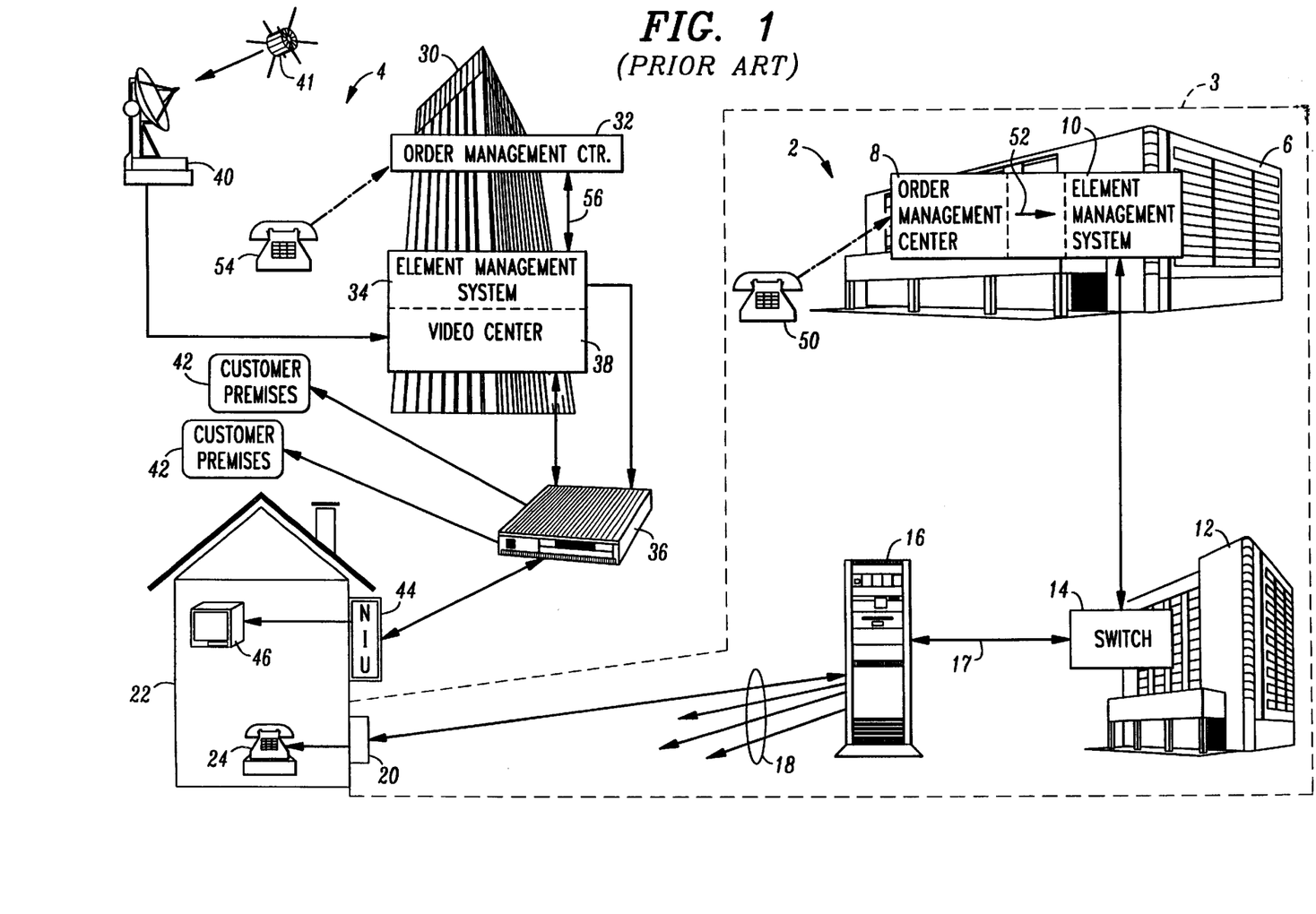
FIG. 1 is a functional block diagram showing a prior art cable communication system and a conventional telephone network with no interoperation therebetween.
Figure 2:
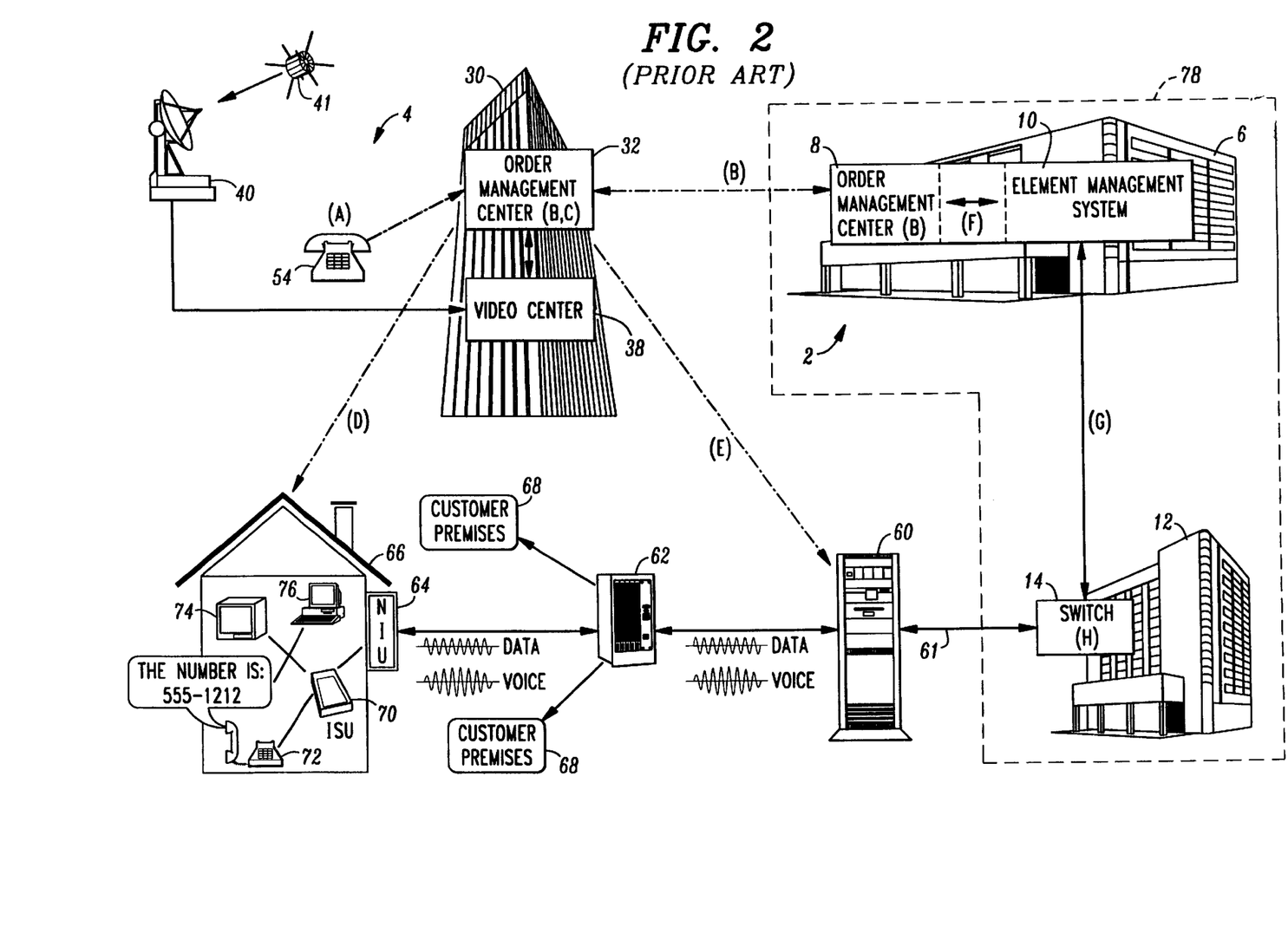
FIG. 2 is a functional block diagram showing a prior art cable communication system interoperating with a prior art telephone network that is partially integrated with the cable system.

In order to more fully appreciate the present invention shown in FIGS. 3–6 of the drawing, a review of the prior art cable telephone service provisioning methods described by way of background above will now be presented with reference to FIGS. 1 and 2. The functional block diagram of FIG. 1 depicts the current configuration for most cable and telephone subscribers in which a telephone network 2 (enclosed by the dotted line 3) is implemented completely separately from a cable communication system 4. As is well known, the telephone network 2 includes a business center 6 operated by a telephone service provider and containing an OMC 8 and an EMS 10. The EMS 10 is connected to a Central Office 12 containing a switch 14, such as a Class 5 ESS® switch from Lucent Technologies, Inc. The switch 14 itself connects to a Remote Digital Terminal (RDT) 16 via a conventional TR-303 (Technical Reference-303) interface 17. As is known, a TR-303 interface integrates a Digital Loop Carrier System (DLC) into a Local Digital Switch (LDS) at the DS1 digital transmission rate. The RDT 16 terminates multiple tip/ring pairs 18, one of which connects to a telephone line drop 20 located at a customer premises 22. A conventional telephone 24 is connected to the line drop 20.

The cable communication system 4 includes a business center 30 operated by a cable service provider and containing an OMC 32 and an EMS 34. The EMS 34 is connected to a cable head end 36. The business center 30 also includes a video center 38 connected to the head end 36. The video center is further connected to a satellite dish 40 that receives a down link video feed from an Earth-orbiting satellite 41. The cable head end 36 connects to the customer premises 22 and to other customer premises, two of which are shown by reference numeral 42. The coaxial cable drop at the customer premises 22 includes a conventional NIU 44. The NIU is shown, by way of example, as being connected to a television set 46.

The separate telephone network 2 and cable communication system 4 of FIG. 1 require a call to each service provider to initiate service. Specifically, to initiate telephone service from the telephone network service provider, a customer must call the telephone business center 6 using an in-service telephone 50 and speak to someone in the telephone service provider OMC 8. After the service option information is received from the customer at the OMC 8, the information is provided to the telephone service provider EMS 10, as shown by the arrow 52. The EMS 10 then instructs the switch 14 to provision service to the customer premises 22 in conventional fashion. If necessary, a truck roll is made to the customer premises 22 to install required equipment.

To initiate cable service from the cable service provider, a customer must call the cable business center 30 using an in-service telephone 54 and speak to someone in the cable service provider OMC 32. After the service option information is received from the customer at the OMC 32, the information is provided to the cable service provider EMS 34, as shown by arrow 56. If necessary, a truck roll is made to the customer premises 22 to install required equipment.

In FIG. 1, therefore, the provisioning and installation of cable service and telephone service are completely independent of each other and there is no common point where this activity or the two physical networks come together.

Turning now to FIG. 2, the elements of the telephone network 2 and the cable communication system 4 are the same as in FIG. 1 except that the cable head end is integrated with the RDT to provide an integrated head end and TR-303 compliant RDT 60 (hereinafter referred to as "RDT"). The telephone network 2 is thus partially integrated into the cable communication system 4. As shown by the dotted line 78, only the business center 6 and the switch 14 are owned by the telephone service provider.

The RDT 60 connects via a TR-303 interface 61 to the switch 14. It also connects via a broadband distribution terminal 62 to an NIU 64 located at a subscriber premises 66. Other customer premises, as shown by reference numeral 68, may also be connected to the distribution terminal 62. Note that the coaxial cable connections between the RDT 60 and the NIU 64 are able to carry data and voice traffic, and thus enable cable telephone service to be provided to the customer premises 66. Within the customer premises 66 is an ISU 70 that acts as a network hub within the premises. Connected to the ISU 70 is a digital telephone 72, and by way of further example, a television set 74 and a computer 76.

In order to provision cable telephone service to the customer premises 66, a number of manual steps are required. First, as shown at "A" in FIG. 2, a potential cable telephone subscriber must first call the cable service provider OMC 32 using the in-service telephone 54. The cable service provider determines whether service is possible by checking its own assignment resources and by making a request to the telephone service provider OMC 8 to check its assignment resources. The OMC 32 obtains service option information from the subscriber and forwards this information to the OMC 8. The foregoing steps are shown at "B" in FIG. 2. As shown at "C" in FIG. 2, the OMC 32 then schedules the installation of necessary equipment at the subscriber premises 66 and also schedules provisioning of the RDT 60 (if necessary).

As shown at "D" in FIG. 2, a truck roll is made to the subscriber premises 66 so that a cable service provider installer can install a cable drop, the NIU 64 and the ISU 70 (unless this equipment is already in place). The customer may then plug the cable telephone 72 into the ISU 70. As shown at "E" in FIG. 2, a truck roll may also need to be made to the RDT 60 to associate the ESN of the ISU 70 to a CRV provided by the telephone service provider. Prior to, during, or after the installation steps "D" and "E" of FIG. 2, the telephone service provider OMC 8 requests the EMS 10 to provision the switch 14 for telephone service to the customer premises 66 based on the service option information provided by the subscriber. This is shown at "F" in FIG. 2. The EMS 10 sends the service option information and a DN (Dialed Number) to the switch 14 with instructions to associate this information with the CRV. This is shown at "G" in FIG. 2. Provisioning is completed at "H" in FIG. 2 and verified by the cable service provider installer, who then notifies the OMC 32 that the installation order has been completed. Notification of installation completion is provided to the telephone service provider OMC 8 by the EMS 10. The OMC 32 and the OMC 8 then activate their billing systems.

Figure 3:
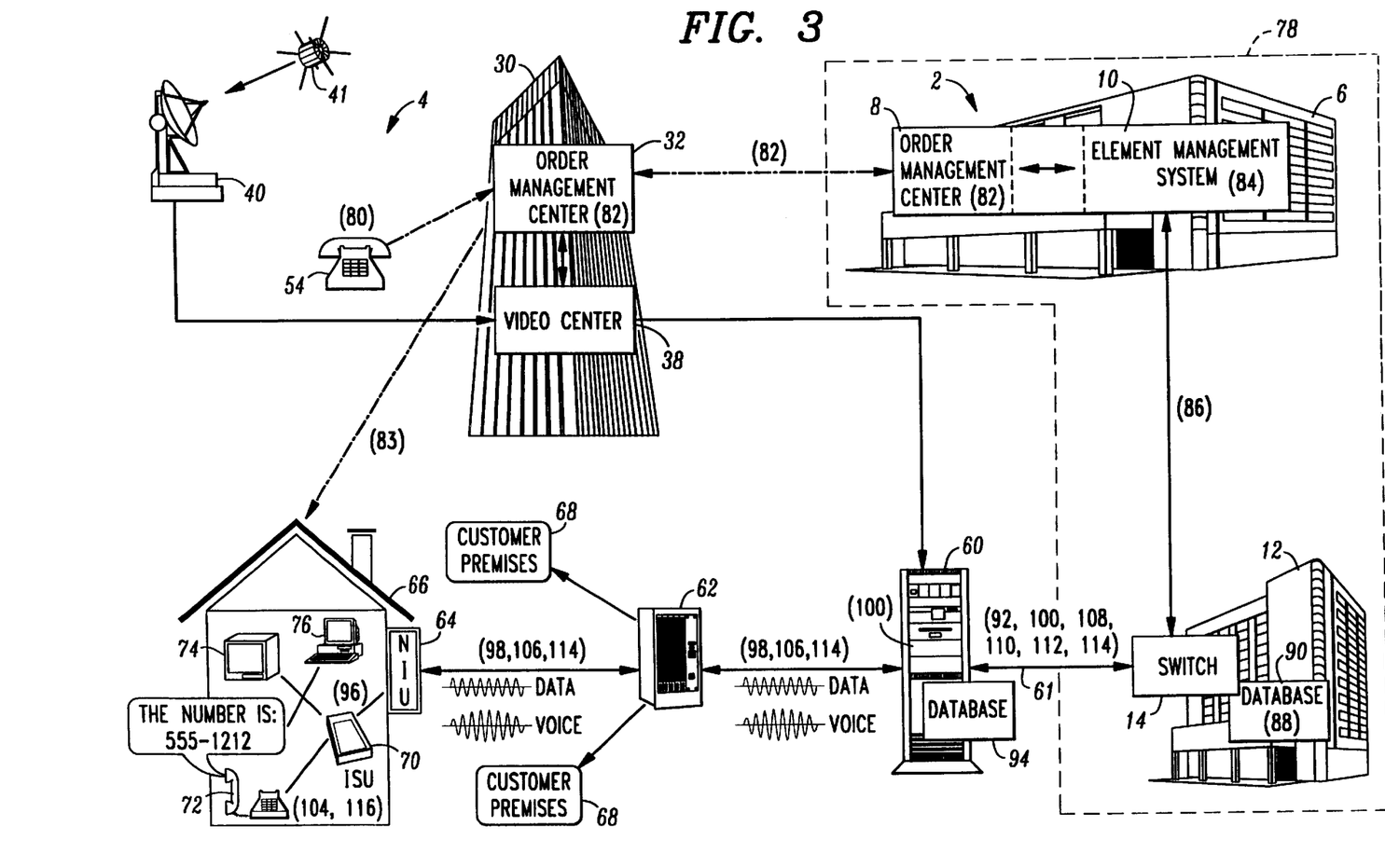
FIG. 3 is functional block diagram showing a first embodiment of the invention for use in a partially-integrated cable communication system and telephone network in which an OMC and a telephone switch are separately owned.

Turning now to FIG. 3, a first preferred embodiment of the present invention is shown in which the elements of the telephone network 2 and the cable communication system 4 are the same as in FIG. 2 except as noted below. Again, the telephone network 2 and the cable communication system 4 are partially integrated, i.e., the cable head end is integrated into the TR303-compliant Remote Digital Terminal (RDT) 60. In addition, the RDT 60 and the switch 14 are programmed to exchange service provisioning information via the existing TR303 Embedded Operations Channel (EOC). In accordance with the invention, the EOC message set is expanded to provide this new capability.

Figure 4A:
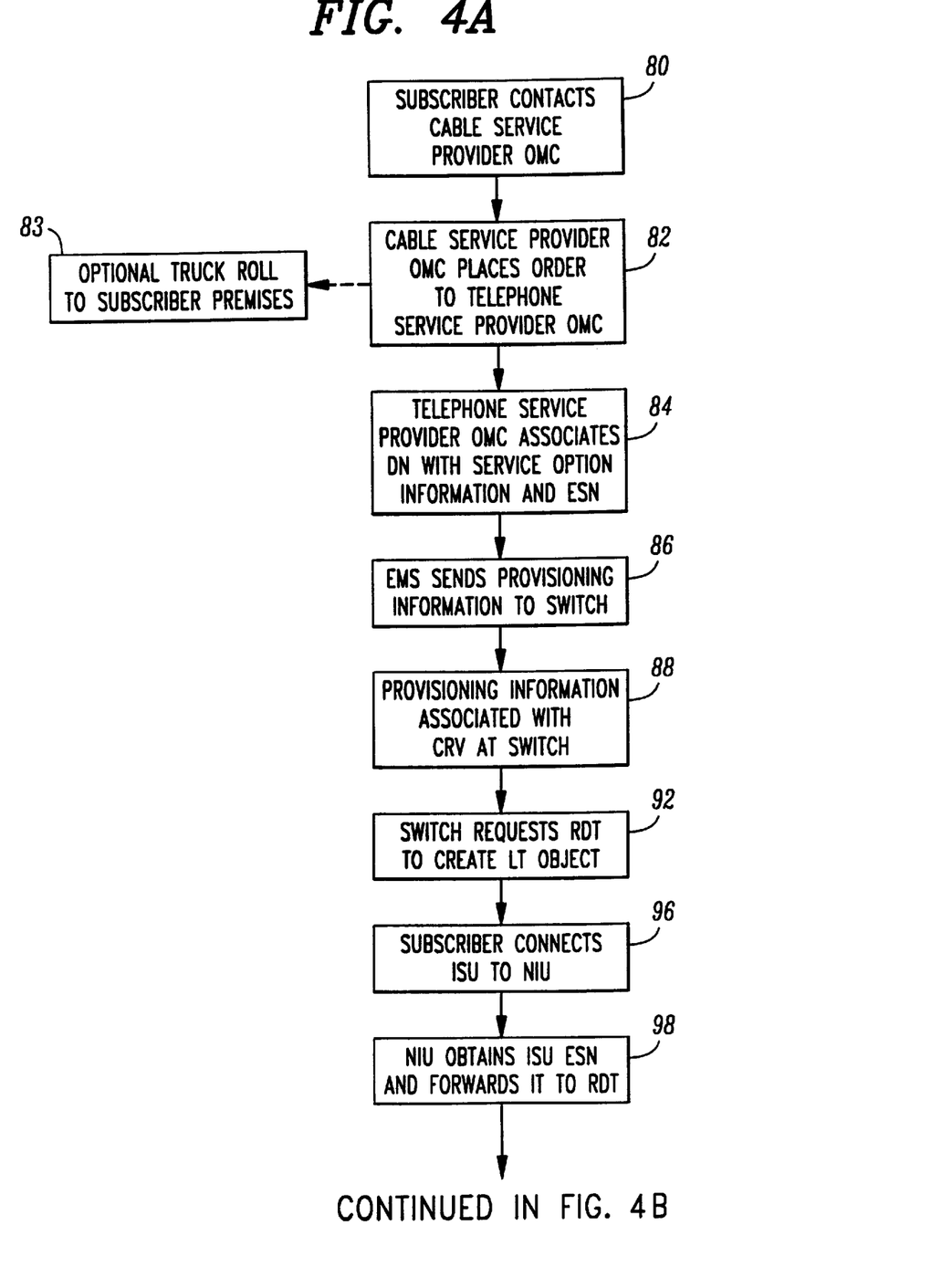
FIGS. 4A and 4B represent a flow diagram showing method steps performed in accordance with the first embodiment of the invention.
Figure 4B:
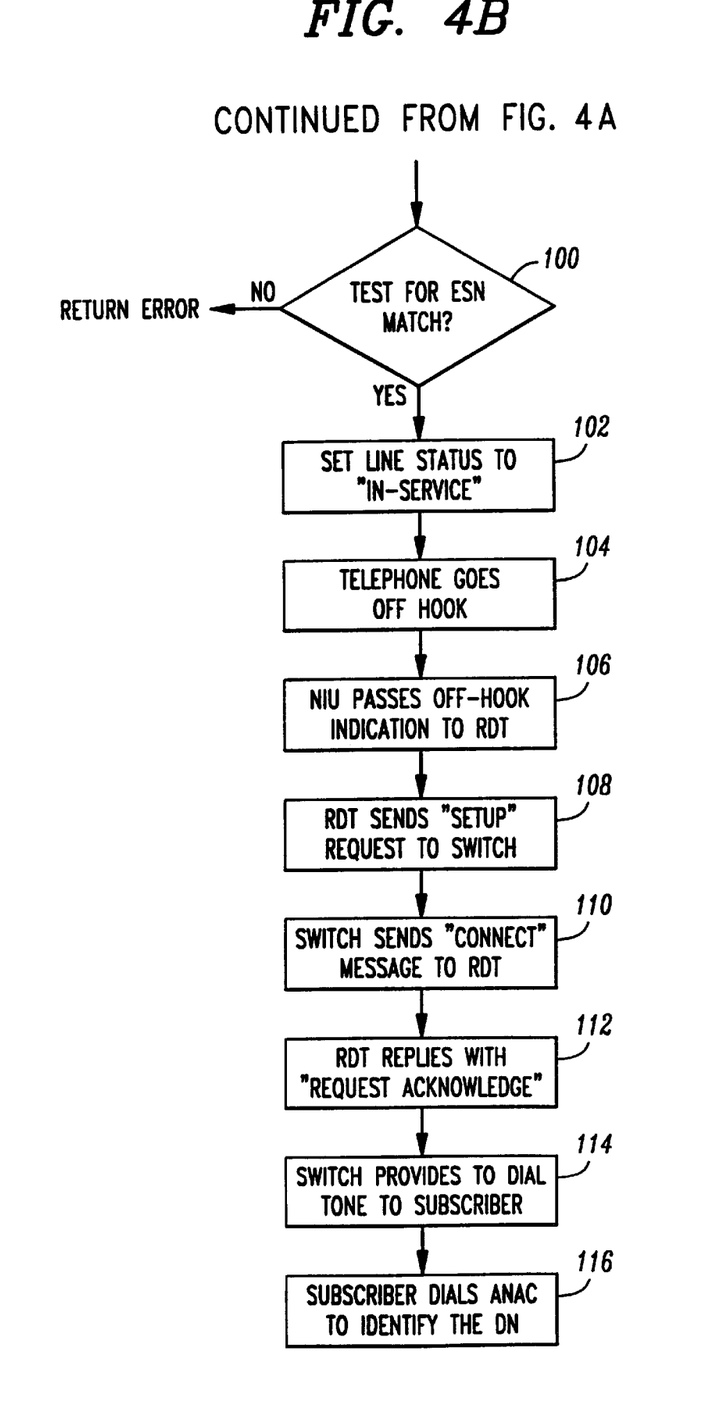

The method steps performed in accordance with the FIG. 3 embodiment to provision telephone service to a customer premises equipment 72 will now be described with additional reference to the flow diagram of FIG. 4. In a first step 80, a potential cable telephone subscriber contacts the cable service provider OMC 32 using the in-service telephone 54, and subscribes to telephone service (and possibly cable service as well). In step 82, the OMC 32 contacts the telephone service provider OMC 8 and places a telephone service order. An optional step 83 may also be performed to dispatch a cable service provider installer to the customer premises 66 to install any required equipment. The service order given to the OMC 8 includes service option information and an encrypted version of the ESN of the ISU 70, which is initially provided by the subscriber. In step 84, the telephone service provider EMS 10 associates a DN with the service option information (as call features) and the encrypted ESN provided by the OMC 32. In step 86, the EMS 10 sends the service option information, the encrypted ESN and the DN to the switch 14. In step 88, the service option information, the encrypted ESN, and the DN are associated with a CRV in a database 90 associated with the switch 14. In step 92, the switch 14 requests the RDT 60, via the TR303 interface 61, to create an ALT object in a database 94 associated with the RDT. The encrypted ESN is also passed to the RDT 60, where it is stored for future use. At this point, however, the line is not yet placed into a full "In Service" state.

In step 96, the subscriber (or the cable service provider installer) connects the ISU 70 to the cable appearance at the customer premises 66, i.e., to the NTU 64. The ISU then conventionally establishes communication with the NIU 64. In step 98, the NIU obtains the ISU's ESN and forwards it in encrypted form in an NRS message to the RDT 60. In step 100, the RDT 60 compares the encrypted ESN received from the NIU 64 against the encrypted ESN received from the switch 14 at the time that the CRV was provisioned. If the ESNs match in step 100, (i.e., verification passes) the RDT 60 notifies the switch 14 via a new Change-In-Status EOC message to set the line status to "In Service" (IS) in step 102. From this point forward the RDT 60 will accept OFF-HOOK messages from the NIU 64. If the ESNs do not match in step 100, an error is returned.

Following provisioning, the subscriber (or installer) connects the telephone 72 to the ISU 70 and the telephone goes off-hook in step 104. In step 106, the NIU 64 detects and passes the OFF-HOOK indication to the RDT 60. In step 108, the RDT recognizes the OFF-HOOK signal and sends a "SETUP" request for the corresponding CRV to the switch 14. In step 110, the switch 14 verifies that the requesting CRV is permitted to originate and if so sends a "CONNECT" message to the RDT 60. In step 112, the RDT 60 replies with a "CONNECT ACKNOWLEDGE" message and connects the CRV to a time-slot assigned by the switch. The switch 14 then provides dial tone to the subscriber in step 114. In step 116, the subscriber (or installer) dials an Automatic Number Announcement Circuit (ANAC) provided at the time of the service request to determine the DN assigned to the line.

Figure 5:
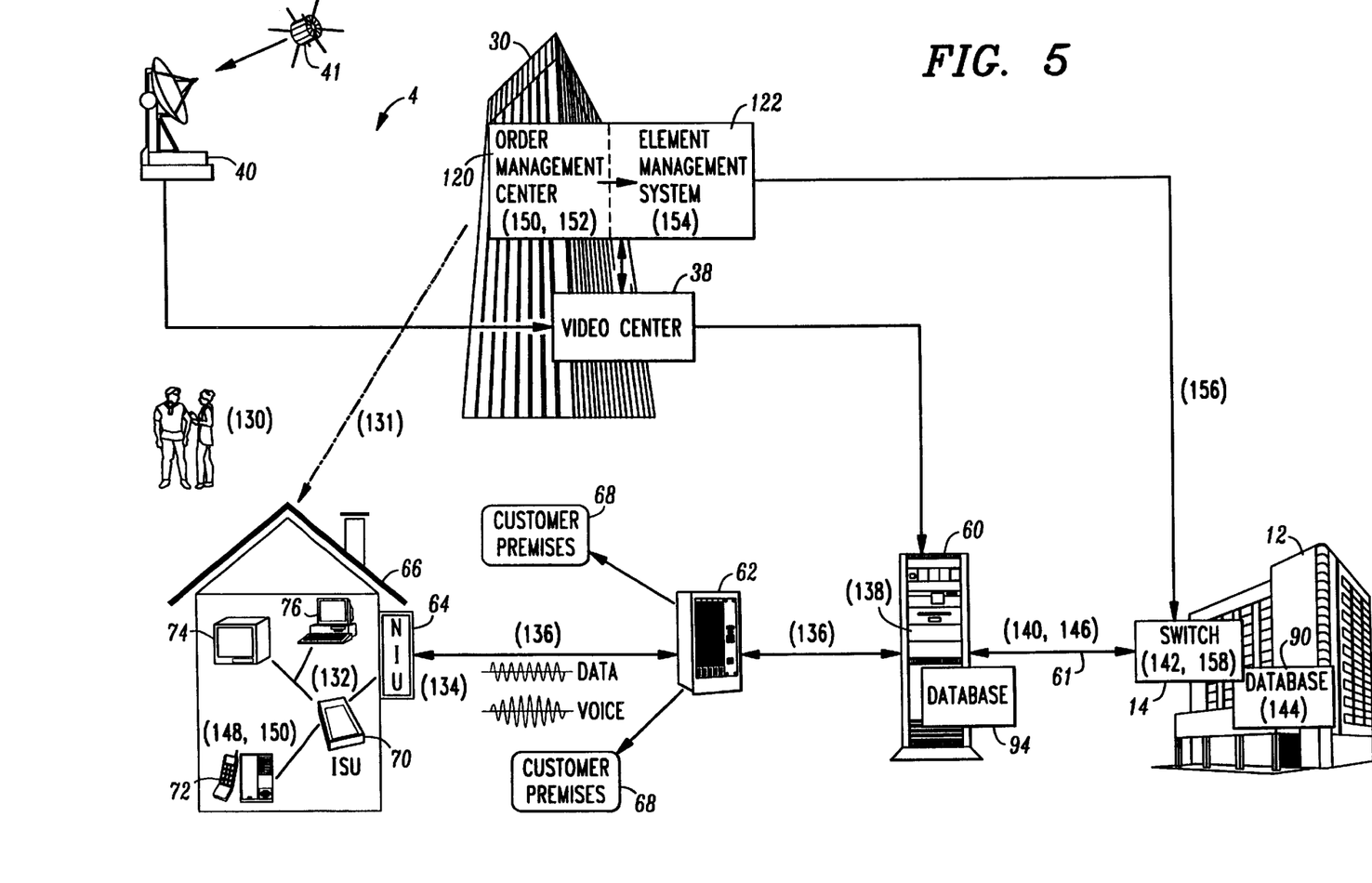
FIG. 5 is a functional block diagram showing a second embodiment of the invention for use in a fully-integrated cable communication system and telephone network in which an OMC and a telephone switch are co-owned.

Turning now to FIG. 5, a second preferred embodiment of the present invention is shown. The elements of the cable communication system 4 are the same as in FIG. 3, but the telephone network 2 of FIG. 3 is effectively merged into the cable communication system 4. Thus, the cable service provider business center 30 now includes a unified OMC 120 and an EMS 122. There is no separate telephone network business center 6. The switch 14 (and possibly the entire Central Office 12) is also controlled by the cable service provider. In addition, the RDT 60 and the switch 14 are programmed to exchange service provisioning information via the existing TR303 Embedded Operations Channel (EOC). As in the case of the first embodiment of the invention, the EOC message set is expanded to provide this new capability.

Figures 6A, 6B:
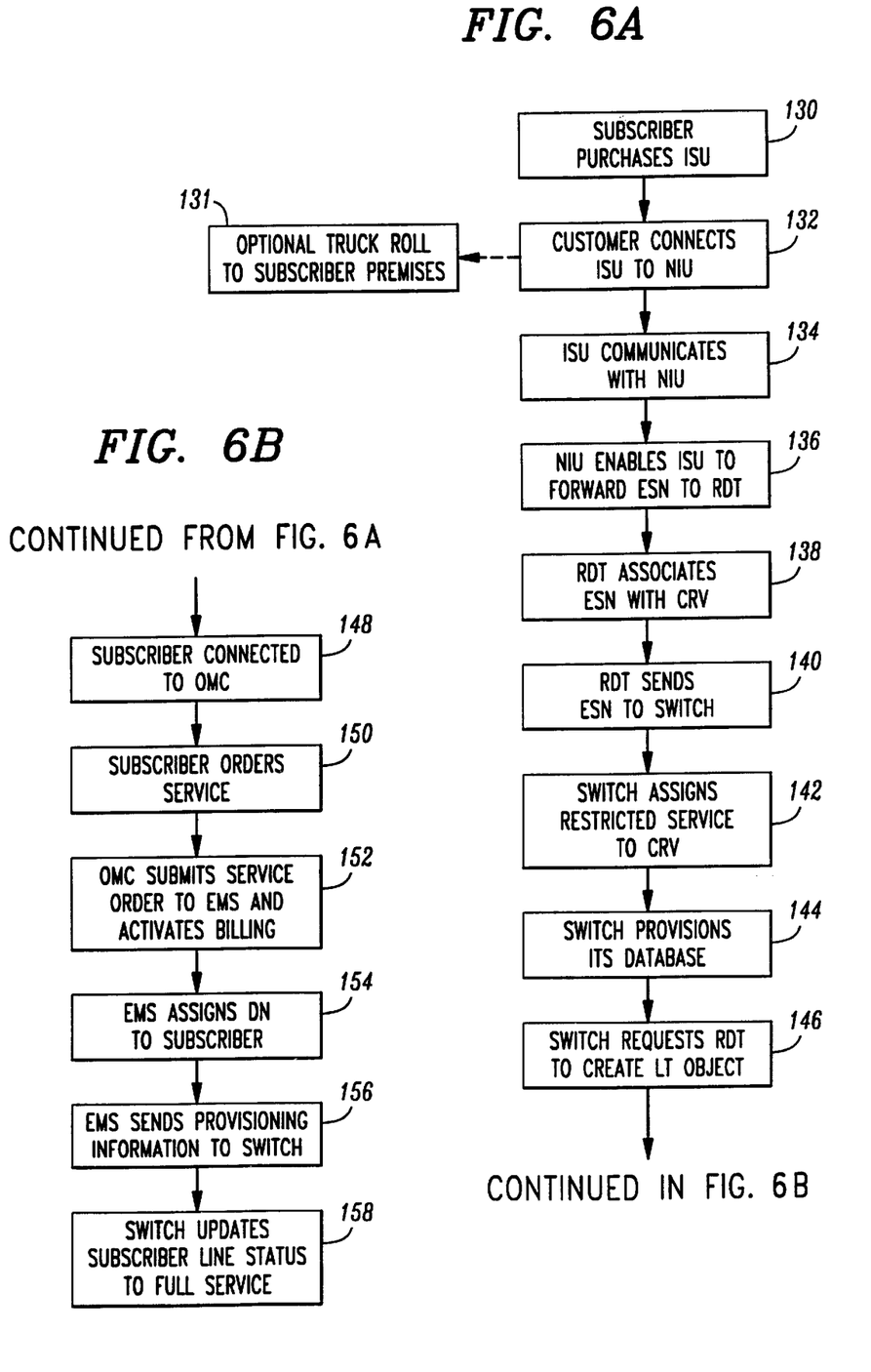
FIGS. 6A and 6B represent a flow diagram showing method steps performed in accordance with the first embodiment of the invention.

The method steps performed in accordance with the FIG. 5 embodiment to provision telephone service to the customer premises equipment 72 will now be described with additional reference to the flow diagram of FIG. 6.

In a first step 130, a potential cable telephone service subscriber purchases the ISU 70 from a retailer (or from the cable service provider). In optional step 131, a truck roll is made to the customer premises 66 to install the NIU 64 and run a cable drop thereto (unless this equipment is already in place). In step 132, the customer connects the ISU 70 to the cable appearance at the customer premises 66, i.e., to the NIU 64. In step 134, the ISU 70 establishes communication with the NIU 64. In step 136, the NIU enables the ISU to forward its encrypted ESN in an NRS message to the RDT 60. In step 138, the RDT 60 associates the ESN in the incoming NRS message with a CRV and in step 140 notifies the switch 14 via the EOC carried by the TR-303 interface 61. In step 142, the switch 14 recognizes the request and assigns restricted service to the requesting CRV by means of a default Line Class Code (LCC) with a "hotline" connection to the service provider OMC 120. After successful provisioning of its own database 90 in step 144, the switch 14 sends a request to the RDT 60 in step 146 to create an ALT object for the CRV.

In step 148, the subscriber connects the telephone 72 to the ISU 70, goes off-hook, and is switched directly to the OMC 120. In step 150, the subscriber places an order for telephone service (and possibly cable service as well), specifying the desired service options. In step 152, the OMC 120 submits a service order containing service option information for the requested telephone service (and possibly cable service as well) to the EMS 122 and activates the billing process. In step 154, the EMS assigns a DN to the subscriber and in step 156 sends the subscriber's telephone service option information and line characteristics (e.g., the DN) to the switch 14. In step 158, the switch 14 updates the subscriber's line status from "restricted level" to full service and adds any features purchased by the subscriber. The subscriber is now fully subscribed for cable telephone service.

Accordingly, a novel system and method for provisioning cable telephone service are disclosed. While various embodiments of the invention have been described, it should be apparent that many variations and alternative embodiments could be implemented in accordance with the invention. For example, note that Steps 148 through 152 of FIGS. 5 and 6 could be automated by connecting the subscriber's initial service setup call to a computerized system (not shown) at the OMC 120. This system could query the subscriber to select the desired service option features one of two ways: (1) via the telephone Touch Tone™ keypad, or (2) via menus sent to the television set 74. The subscriber would be provided a new telephone number (permanent or temporary) along with a confirmation number. The data collected would then be used to provision the video center 38 and the switch database 90. Service could thus be available within a matter of minutes. It is understood, therefore, that the invention is not to be in any way limited except in accordance with the spirit of the appended claims and their equivalents.

What is claimed is:

1. A method for provisioning cable telephone service in a cable communication system having a head end Remote Digital Terminal (RDT) respectively communicating with a broadband network, a telephone switch and a customer premises Integrated Service Unit (ISU), and also including an Order Management Center (OMC) associated with the RDT, the switch, or both, said method comprising the steps of:

notifying said RDT of a new service request by way of a service request message sent from said ISU to said RDT;

notifying said switch of said new service request by way of provisioning information sent from said OMC to said switch via an Element Management System (EMS) associated with said switch; and exchanging information between said RDT and said switch to coordinate the provisioning of establishing telephone service on behalf of customer premises equipment connected to said ISU.

2. A method in accordance with claim 1 wherein said provisioning information sent to said switch includes service option information that is initially received at said OMC via a telephone having existing service.

3. A method in accordance with claim 1 wherein said provisioning information sent to said switch includes service option information that is initially received at said OMC via a temporary telephone connection established between said customer premises equipment to said OMC.

4. In a cable communication system having a head end Remote Digital Terminal (RDT) respectively communicating with a broadband network, a telephone switch and an Integrated Service Unit (ISU) located at a customer premises having customer premises equipment, and also including an Order Management Center (OMC) associated with said RDT, a method for provisioning cable telephone service to customer premises equipment via the ISU, comprising the following steps:

receiving at said OMC a request for telephone service to said customer premises equipment, said telephone service request including service option information and an Electronic Serial Number (ESN) associated with said customer premises equipment;

sending said service option information and said ESN from said OMC to an Element Management System (EMS) associated with said switch;

sending said service option information, said ESN and a Directory Number (DN) from said EMS to said switch;

storing said service option information, said ESN and said DN in a database associated with said switch (switch database);

determining a Call Reference Value (CRV) at said switch and associating it with said service option information, said ESN and said DN in said switch database;

sending a request from said switch to said RDT to create an Analog Line Termination (ALT) object in a database associated with said RDT (RDT database);

sending said ESN from said switch to said RDT for storage in said RDT database in association with said ALT;

receiving at said RDT a New Request for Service (NRS) message sent from said ISU via a Network Interface Unit (NIU) located at said customer premises, said NRS containing said ESN;

comparing at said RDT said ESN received in said NRS message with said ESN stored in said RDT database; and upon said comparing step producing a positive result, sending a Change-In-Status (CIS) message from said RDT to said switch requesting that said CRV be set to an In-Service (IS) status.

5. In a cable communication system having a head end Remote Digital Terminal (RDT) respectively communicating with a broadband network, a telephone switch and an Integrated Service Unit (ISU) located at a customer premises having customer premises equipment, and also including an Order Management Center (OMC) associated with said RDT, a system for provisioning cable telephone service to customer premises equipment via the ISU, comprising:

means in said OMC for receiving a request for telephone service to said customer premises equipment, said telephone service request including service option information and an Electronic Serial Number (ESN) associated with said customer premises equipment;

means in said OMC for sending said service option information and said ESN to an Element Management System (EMS) associated with said switch;

means in said EMS for sending said service option information, said ESN and a Directory Number (DN) to said switch;

means in said switch for storing said service option information, said ESN and said DN in a database associated with said switch (switch database);

means in said switch for determining a Call Reference Value (CRV) and associating it with said service option information, said ESN and said DN in said switch database;

means in said switch for sending a request to said RDT to create an Analog Line Termination (ALT) object in a database associated with said RDT (RDT database);

means in said switch for sending said ESN to said RDT for storage in said RDT database in association with said ALT;

means in said RDT for receiving a New Request for Service (NRS) message sent from said ISU via a Network Interface Unit (NIU) located at said customer premises, said NRS containing said ESN;

means in said RDT for comparing said ESN received in said NRS message with said ESN stored in said RDT database; and means in said RDT responsive to said comparing step producing a positive result for sending a Change-In-Status (CIS) message to said switch requesting that said CRV be set to an In-Service (IS) status.

6. In a cable communication system having a head end Remote Digital Terminal (RDT) respectively communicating with a broadband network, a telephone switch and an Integrated Service Unit (ISU) located at a customer premises having customer premises equipment, and also including an Order Management Center (OMC) associated with said RDT, a method for provisioning cable telephone service to customer premises equipment via the ISU, comprising the following steps:

receiving at said RDT a New Request for Service (NRS) message sent from said ISU via a Network Interface Unit (NIU) located at said customer premises, said NRS containing said ESN;

associating said ESN with a Call Reference Value (CRV) at said RDT;

sending a message from RDT to said switch advising of said ESN and said CRV;

assigning restricted telephone service to said CRV using a selected Line Class Code (LCC) with connectivity to said OMC;

sending a message from said switch to said RDT requesting said RDT to create an Analog Line Termination object for said CRV in a database associated with said RDT (RDT database);

in response to said subscriber premises equipment going off hook, setting up a connection from said customer premises equipment to said OMC;

receiving service option information relative to said customer premises equipment at said OMC and requesting an Element Management System (EMS) associated with said switch (and said OMC) to setup service for said customer premises equipment;

determining a Directory Number (DN) to assign to said customer premises equipment and forwarding said service option information and said DN from said EMS to said switch;

storing said service option information and said DN in a database associated with said switch (switch database); and activating said CRV to a full In-Service (IS) status.

7. In a cable communication system having a head end Remote Digital Terminal (RDT) respectively communicating with a broadband network, a telephone switch and an Integrated Service Unit (ISU) located at a customer premises having customer premises equipment, and also including an Order Management Center (OMC) associated with said RDT, a system for provisioning cable telephone service to customer premises equipment via the ISU, comprising the following steps:

means in said RDT for receiving a New Request for Service (NRS) message sent from said ISU via a Network Interface Unit (NIU) located at said customer premises, said NRS containing said ESN;

means in said RDT for associating said ESN with a Call Reference Value (VRV);

means in said RDT for sending a message to said switch advising of said ESN and said CRV;

means in said switch for assigning restricted telephone service to said CRV using a selected Line Class Code (LCC) with connectivity to said OMC;

means in said switch for sending a message to said RDT requesting said RDT to create an Analog Line Termination object for said CRV in a database associated with said RDT (RDT database);

means in switch responsive to said subscriber premises equipment going off hook for setting up a connection from said customer premises equipment to said OMC;

means in said OMC for receiving service option information relative to said customer premises equipment and requesting an Element Management System (EMS) associated with said switch (and said OMC) to setup service for said customer premises equipment;

means in said EMS for determining a Directory Number (DN) to assign to said customer premises equipment and forwarding said service option information and said DN to said switch;

means in said switch for storing said service option information and said DN in a database associated with said switch (switch database); and means in said switch for activating said CRV to a full In-Service (IS) status.

8. In a cable communication system having a head end Remote Digital Terminal (RDT) respectively communicating with a broadband network, a telephone switch and a customer premises Integrated Service Unit (ISU), and also including an Order Management Center (OMC) associated with said RDT, said switch, or both, a method for provisioning cable telephone service to customer premises equipment via the ISU, comprising the following steps (performed in any order):

receiving at said RDT a New Request for Service (NRS) message sent from a customer premises Network Interface Unit (NIU) connected to said ISU, said NRS containing an Electronic Serial Number (ESN) of said customer premises equipment;

associating said ESN with a Call Reference Value (CRV) at said RDT;

in response to service option information relative to the customer premises equipment being received at said OMC, causing a provisioning message to be sent to said switch for provisioning telephone service on behalf of said customer premises equipment in association with said CRV;

creating an Analog Line Termination (ALT) at said RDT that corresponds to said CRV; and activating said ALT for service.

9. A method in accordance with claim 8 wherein said provisioning step includes (1) said OMC sending said service option information and said ESN to an Element Management System (EMS) associated with said switch, (2) said EMS sending said service option information, said ESN and a Directory Number (DN) to said switch, (3) said switch storing said service option information, said ESN and said DN in a database associated with said switch, and (4) said switch determining said CRV and associating it with said service option information, said ESN and said DN in said database.

10. A method in accordance with claim 9 wherein said provisioning step further includes said RDT receiving said ESN and said CRV from said switch.

11. A method in accordance with claim 10 wherein said creating step includes said RDT receiving and responding to a request to create said ALT from said switch.

12. A method in accordance with claim 11 further including said RDT comparing said ESN received from said switch against said ESN received from said NIU.

13. A method in accordance with claim 12 further including, in response to a positive comparison resulting from said comparing step, said RDT notifying said switch via a Change-In-Status (CIS) message to place a line associated with said CRV in active service.

14. A method in accordance with claim 8 wherein said ESN is encrypted.

15. A method in accordance with claim 8 wherein said provisioning step includes (1) said RDT notifying said switch of said ESN and said CRV, (2) said switch assigning restricted telephone service to said CRV using a selected Line Class Code (LCC) with connectivity to said OMC, (3) said switch, in response to said subscriber premises equipment going off hook, setting up a connection from said customer premises equipment to said OMC, (4) said OMC receiving said service option information and requesting an Element Management System (EMS) associated with said switch (and said OMC) to setup service for said customer premises equipment, (5) said EMS determining a Directory Number (DN) for said customer premises equipment and forwarding said service option information and said DN to said switch, and (6) said switch storing said service option information and said DN in a database associated with said switch.

16. A method in accordance with claim 15 wherein sub-step 5 is performed by an automated prompt-and-collect system in said OMC.

17. A method in accordance with claim 16 wherein said prompt-and-collect system includes sending and receiving prompt-and-collect information between said OMC, said RDT, and a customer premises television device connected to said NIU.

18. In a cable communication system having a head end Remote Digital Terminal (RDT) respectively communicating with a broadband network, a telephone switch and a customer premises Integrated Service Unit (ISU), and also including an Order Management Center (OMC) associated with said RDT, said switch, or both, a system for provisioning cable telephone service to customer premises equipment via the ISU, comprising:

means for receiving at said RDT a New Request for Service (NRS) message sent from a customer premises Network Interface Unit (NIU) connected to said ISU, said NRS containing an Electronic Serial Number (ESN) of said customer premises equipment;

means for associating said ESN with a Call Reference Value (CRV) at said RDT;

means responsive to service option information relative to the customer premises equipment being received at said OMC, for causing a provisioning message to be sent to said switch for provisioning telephone service on behalf of said customer premises equipment in association with said CRV;

means for creating an Analog Line Termination (ALT) at said RDT that corresponds to said CRV; and means for activating said ALT for service.

19. A system in accordance with claim 18 wherein said provisioning means includes (1) means in said OMC for sending said service option information and said ESN to an Element Management System (EMS) associated with said switch, (2) means in said EMS for sending said service option information, said ESN and a Directory Number (DN) to said switch, (3) means in said switch for storing said service option information, said ESN and said DN in a database associated with said switch, and (4) means in said switch for determining said CRV and associating it with said service option information, said ESN and said DN in said database.

20. A system in accordance with claim 19 wherein said provisioning means further includes means in said RDT for receiving said ESN and said CRV from said switch.

21. A system in accordance with claim 20 wherein said creating means includes means in said RDT for receiving and responding to a request to create said ALT from said switch.

22. A system in accordance with claim 21 further including means in said RDT for comparing said ESN received from said switch against said ESN received from said NIU.

23. A system in accordance with claim 22 further including means responsive to a positive comparison result being determined by said comparing means for notifying said switch via a Change-In-Status (CIS) message to place a line associated with said CRV in active service.

24. A system in accordance with claim 18 wherein said ESN is encrypted.

25. A system in accordance with claim 18 wherein said provisioning means includes (1) means in said RDT for notifying said switch of said ESN and said CRV, (2) means in said switch for assigning restricted telephone service to said CRV using a selected Line Class Code (LCC) with connectivity to said OMC, (3) means in said switch responsive to said subscriber premises equipment going off hook for setting up a connection from said customer premises equipment to said OMC, (4) means in said OMC for receiving said service option information and requesting an Element Management System (EMS) to setup service for said customer premises equipment, (5) means in said EMS for determining a Directory Number (DN) for said customer premises equipment and forwarding said service option information and said DN to said switch, and (6) means in said switch for storing said service option information and said DN in a database associated with said switch.

26. A system in accordance with claim 25 wherein said receiving means in said OMC includes an automated prompt-and-collect system.

27. A system in accordance with claim 26 wherein said prompt-and-collect system includes means for sending and receiving prompt-and-collect information between said OMC, said RDT, and a customer premises television device connected to said NIU.

* * * * *